United States Patent [19]

Häfner

[11] Patent Number: 5,394,747
[45] Date of Patent: Mar. 7, 1995

[54] APPARATUS FOR CONTINUOUS GRAVIMETRIC METERING OF A POURABLE MATERIAL

[75] Inventor: Hans W. Häfner, Aichach-Walchshofen, Germany

[73] Assignee: Pfister GmbH, Augsburg, Germany

[21] Appl. No.: 50,226

[22] PCT Filed: Sep. 4, 1992

[86] PCT No.: PCT/EP92/02053

§ 371 Date: Jul. 2, 1993

§ 102(e) Date: Jul. 2, 1993

[87] PCT Pub. No.: WO93/05372

PCT Pub. Date: Mar. 18, 1993

[30] Foreign Application Priority Data

Sep. 6, 1991 [DE] Germany .......... 41 29 726.1

[51] Int. Cl.6 .......... G01F 1/115; G01F 13/00
[52] U.S. Cl. .......... 73/218; 222/77; 222/342; 222/470
[58] Field of Search .......... 73/218, 861; 222/77, 222/342, 470

[56] References Cited

U.S. PATENT DOCUMENTS

| 3,561,643 | 2/1921 | Klover | 222/55 |
| 4,528,848 | 7/1985 | Hafner | 73/218 |
| 5,125,535 | 6/1992 | Ohlman | 227/77 |

Primary Examiner—Richard E. Chilcot, Jr.
Assistant Examiner—Harshad Patel
Attorney, Agent, or Firm—Gerald E. Linden

[57] ABSTRACT

As a particularly simple and compact metering apparatus for the continuous gravimetric metering of pourable material it is suggested to form a rotor (5) driven about a vertical rotational axis (4) and supported about a horizontal pivot axis (7) as a disk-type smooth-plane measuring disk and to arrange in the discharge region (6) a stripping-off element (10) extending over the radius of the measuring disk (9). In a preferred embodiment of the invention the pivot axis (7) extends - seen in plan view - centrally through the charge tunnel (3) and the stripping-off element (10).

12 Claims, 2 Drawing Sheets

APPARATUS FOR CONTINUOUS GRAVIMETRIC METERING OF A POURABLE MATERIAL

TECHNICAL FIELD OF THE INVENTION

The invention relates to metering apparatus for continuous gravimetric metering of pourable material passed through a charge tunnel to a rotor driven about a vertical rotational axis, and removed through a discharge region offset in a rotational direction to said charge tunnel, said rotor being supported pivotably about an essentially horizontal pivot axis and being connected to a force measuring device arranged at distance from said pivot axis.

BACKGROUND OF THE INVENTION

Commonly-owned DE 32 17 406 C2 (U.S. Pat. No. 4,528,848) discloses metering apparatus for continuous gravimetric metering of pourable material passed through a charge tunnel to a rotor driven about a vertical rotational axis, and removed through a discharge region offset in a rotational direction to said charge tunnel, said rotor being supported pivotably about an essentially horizontal pivot axis and being connected to a force measuring device arranged at distance from said pivot axis.

In this metering apparatus, the rotor comprises a plurality of receiving pockets which are discharged by supplying pressurized air. Such a metering apparatus is particularly adapted for coal dust metering in burning processes. However, the metering apparatus suggested there is of relative complex design due to the additional pneumatic feeding system for supplying pressurized air and in view of the elastic connecting elements necessary for the free pivotal movement of the rotor. Furthermore, there is a tendency for dome-forming in the pockets of the cellular rotor with pourable material having high humidity or with sticky pourable material, resulting under unfavourable conditions in an insufficient discharging of the pourable material.

SUMMARY OF THE INVENTION

Therefore, it is the object of the invention to provide a particularly simple and compact metering apparatus of the type defined, even adapted for badly flowing pourable material.

This object is solved according to the invention with a metering apparatus for continuous gravimetric metering of pourable material passed through a charge tunnel to a rotor driven about a vertical rotational axis, and removed through a discharge region offset in a rotational direction to said charge tunnel, said rotor being supported pivotably about an essentially horizontal pivot axis and being connected to a force measuring device arranged at distance from said pivot axis, characterized in that: said rotor is formed as a disk-type smooth-plane measuring disk and there is provided in said discharge region a stripping-off element extending over a radius of said measuring disk.

Since the rotor is formed as a disk-type, smooth-plane measuring disk, it is much simpler to be produced, for example by turning processing (e.g., with a lathe) such that the manufacturing costs are considerably lower as with the prior art where the cellular rotor is designed as a die-cast member or a complex welded element. By means of the removing element provided in the discharging region of the measuring disk and extending over half of the diameter of the measuring disk, a fast and continuous discharging of the pourable material is achieved without the necessity of complex pressure ducts. Even slightly sticky pourable material is completely stripped off from the measuring disk such that behind the discharging region no residual amounts of pourable material are left on the measuring disk which might result in measuring inaccuracies.

Preferred improvements of the metering apparatus according to the invention are characterized in the subclaims.

BRIEF DESCRIPTION OF THE DRAWINGS

Embodiments of the metering apparatus of the invention will be explained in more detail hereinafter referring to the drawings. There are shown in.

DETAILED DESCRIPTION OF THE INVENTION

Figure 1:
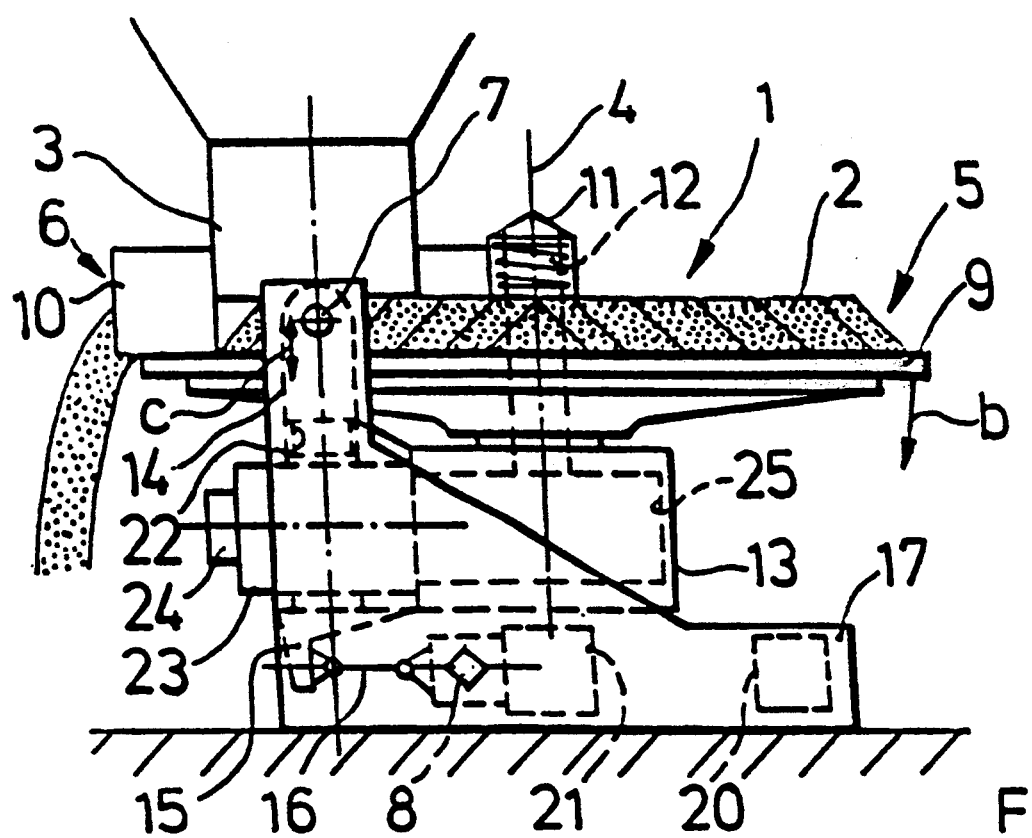
FIG. 1 an elevational view of the metering apparatus of the invention.
Figure 2:
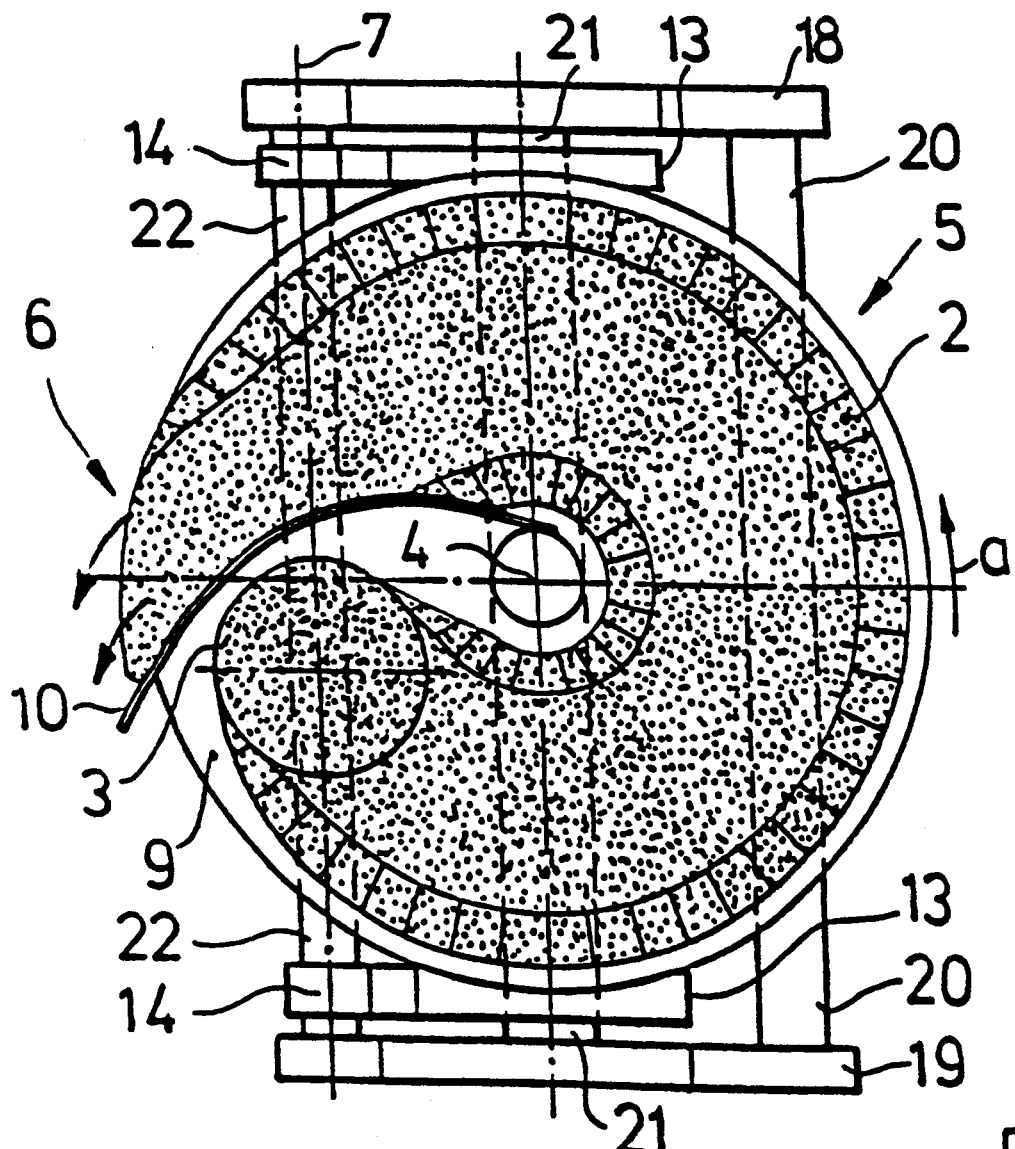
FIG. 2 a plan view of the metering apparatus of FIG. 1.

Referring to FIG. 1 there is shown a metering apparatus 1 in an elevational view for metering pourable material 2 illustrated by dots, with the weight-loading of the metering apparatus being continuously determined, as explained further below. The pourable material 2 passes through a charge tunnel 3 onto a rotor 5 driven in rotational direction a (see FIG. 2) about a vertical rotational axis 4. Upon charging of the pourable material 2 through the charge tunnel 3 there is formed a line of pourable material 2 shown in dotted illustration which leaves the rotor 5 in a discharge region 6 upon a rotational movement on rotor 5 along nearly 360°.

As known per se, the rotor 5 is supported slightly pivotable about an essentially horizontal pivot axis 7, as indicated by arrow b. Thus, rotor 5 loaded by the pourable material 2 slightly pivots downward about the pivot axis 7 and acts onto a force measuring device 8 provided at distance from the pivot axis 7. Preferably, the force measuring device 8 is designed as a force measuring cell operating without displacement such that the pivoting movements according to arrow b are minimum.

According to the invention the rotor 5 is formed as a disk-type smooth-plane measuring disk 9 driven about the vertical rotational axis 4 in a horizontal rotational plane. The pourable material is heaped through the charge tunnel 3 onto this measuring disk 9 such that during the rotational movement a line of pourable material 2 is formed, as illustrated in dotted manner in FIG. 2. The line of pourable material 2 has cone-type inclinations at its inner and outer peripheral surfaces while the top side of the cone of pourable material is smoothed by the bottom edge of the charge tunnel 3. For further equalization there may be provided a stripping bar, or the like. Upon rotational movement of the line of pourable material 2 about nearly a full circle the pourable material 2 arrives at a stripping-off element 10 which is shown curved in the form of an involute (e.g., curved bow). By means of the stripping-off element 10 the pourable material 2 is stripped off from the measuring disk 9 in the discharge region 6 and is passed to a device for further conveying or further processing. Here, the stripping-off element 10 is connected with its inner end to a cap 11 stationary (fixedly) attached at the rotational axis 4 by means of a stationary inner projection (journal element) 12. The stripping-off element 10 may resiliently rest on the surface of the measuring disk 9 in view of a spring indicated in the interior of the cap 11. However, resilient elements may be provided as well at the bottom edge of the stripping-off element 10 such that the bottom edge of the stripping-off element engages the top side of the measuring disk 9 and ensures a safe stripping-off of the pourable material 2. As an alternative to the central fixture of the stripping-off element 10 the stripping-off element 10 can also be fixed at its outer end to a pivot frame 13 by means of a bracket around the measuring disk 9. As may be seen in particular from FIG. 2, the stripping-off element 10 is arranged closely to the charge tunnel 3, resulting in a measuring path as long as possible (around the inner periphery) on the measuring disk 9 for continuously moving the pourable material.

The measuring disk 9 is rotationally supported by the abovementioned pivot frame 13 which in turn is slightly pivotable about the pivot axis 7 according to arrow b. The pivot frame 13 comprises an upwardly directed arm 14 for support at the pivot axis 7 and a downwardly directed lever arm 15 connected via a traction member 16 to the force measuring device 8. This pivot frame 13 is inserted in a base 17 formed, in principle, by two L-type side elements 18 and 19 and, here, by two transversal bars 20 and 21. At the upper end of the base 17 there is provided the pivot axis 7, approximately at the rotational plane of the measuring disk 9 such that upon loading, the measuring disk 9 and the pivot frame 13 supporting the latter are slightly pivotable within the base 17, acting onto the force measuring device 8. The transversal bars 20 and 21 of the base 17 provide a rigid design of the base 17. In a corresponding manner for the pivot frame 13 fitted therein at least one transversal bar 22 is provided for the pivot frame 13, for example between the two vertical arms 14. A corresponding transversal bar 22 could be provided in the region of the lever arm 15 or adjacent to the rotational axis 4 as well. This design of the pivoting arm 13 and the corresponding design of the base 17 results in a twist-free support of the movable elements. Simultaneously, this support for the rotor 5 and the measuring disk 9, respectively, is relatively easy to manufacture and provides a compact design. Thus, for example, the base 17 may be placed in a simple manner onto a building ground directly below a bunker or its charge tunnel 3 such that the total metering apparatus 1 is easy to be transported and to be moved to other bunkers or bins.

Referring to FIG. 1, a motor 23 having a tacho generator (tachometer) 24 is provided below the transversal bar 22. A gearing 25 is flanged to the motor 23, serving for driving the measuring disk 9. Here, the gearing 25 is fitted-in between the side frames of the pivot frame 13. However, with an appropriate design of the motor 23 the gearing 25 may also be omitted such that the motor 23 is directly flanged below the measuring disk 9. The driving motor 23 having a controllable rotational speed and the tacho generator 24 for monitoring the rotational speed of the measuring disk 9 serve for controlling the pourable material according to a comparison of actual and desired quantities by means of known controlling means (not shown), as it has also become known for other continuous gravimetric metering apparatuses. In this connection the values for the momentary weight of the pourable material and the rotational speed determined by means of electrical measuring signals are multiplied for determining the conveying stream density, and the result is compared with a desired value. For maintaining the conveying stream density constant, upon the detection of a difference between the desired and actual values the rotational speed of the driving motor 23 is adjusted such that the product of rotational speed and momentary load is maintained constant. For this purpose there is provided a well-known evaluating device not illustrated in detail which, by means of signal lines, is connected with the force measuring device, on the one hand and, on the other hand, with the tacho generator 24.

In this connection the momentary load of the pourable material 2 is determined by the force measuring device 8 as a load effective along the measuring path of the measuring disk 9, with the mass of the pourable material tending to pivot the measuring disk 9 together with the pivot frame 13, downward about the pivot axis 7, resulting in a loading of the force measuring device 8.

It should be noted that the suggested metering apparatus is adapted for the directly controllable metering of a pourable material in cooperation with a bunker arranged above, without the need of a volumetrically metering charging device for the controllable adjusting to a predetermined conveying stream density, as frequently necessary, for example, for metering belt scales. Thus, the suggested metering device provides a compact apparatus particularly simple to be manufactured and having a high metering accuracy and a high operation safety.

For an adjustment to different piling heights of the line of pourable material 2, the height of the pivot axis 7 may be adjusted according to arrow c, for example by means of easy-operable locks or eccentric bushings (not shown).

It should be noted that the pivot frame 13 together with the measuring disk 9 supported thereby may be pivotally connected to a dome or a frame rather than to the base 17. In this connection it is of importance that the pivot axis 7 not only extends approximately central through the charge tunnel 3 but also approximately central through the longitudinal extension of the stripping-off element 10. This arrangement of the stripping-off element 10 results in the prevention of detrimental moments onto the measuring arrangement, caused by the stripping-off process of the pourable material. As may be gathered from FIG. 2, the pivot axis 7 intersects the stripping-off element 10 approximately at the center thereof. In this situation, the quantity of pourable material piling at the right-hand side of the pivot axis 7 at the inner end of the stripping-off element 10 in the proximity of the axis 4 approximately corresponds to the quantity of pourable material piling at the left-hand side of the pivot axis 7 at the exterior end of the stripping-off element 10. Thus, this region is approximately balanced and the detrimental influences possibly caused during the stripping-off of piled pourable material are minimized. This is correspondingly true for the arrangement of the charge tunnel 3 such that possibly suddenly dropping bulks of pourable material do not detrimentally influence the mass determination on measuring disk 9.

What is claimed is:

1. Metering apparatus for continuous gravimetric metering of pourable material, comprising:
    a rotor driven about a vertical rotational axis;
    a charge tunnel discharging pourable material onto the rotor;

a discharge region, for removing said pourable material from the rotor, offset in a rotational direction to said charge tunnel;

said rotor being supported pivotably about an essentially horizontal pivot axis and being connected to a force measuring device arranged at distance from said pivot axis;

said rotor formed as a non-flexible disk-type, smooth-plane measuring disk;

a stripping-off element provided in said discharge region and extending longitudinal over a radius of said measuring disk; and said horizontal pivot axis intersects said stripping-off element at a longitudinal center thereof.

2. The metering apparatus of claim 1, wherein:
said stripping-off element is formed as a curved bow-type element.

3. The metering apparatus of claim 1, wherein:
said stripping-off element resiliently engages said measuring disk.

4. The metering apparatus of claim 1, wherein:
said stripping-off element is fixed to a cap arranged in a rotationally fixed manner on said rotational axis of said measuring disk.

5. The metering apparatus of claim 1, wherein:
said pivot axis extends centrally through said charge tunnel.

6. The metering apparatus of claim 1, wherein:
said pivot axis is adjustable in respect of height.

7. The metering apparatus of claim 1, wherein:
said measuring disk is supported by a pivot frame which is supported, on the one hand, by an arm at said pivot axis and is provided, on the other hand, with a lever arm being connected to said force measuring device.

8. The metering apparatus of claim 7, wherein:
said lever arm extends vertically downward and is connected to said force measuring device via a traction element.

9. The metering apparatus of claim 1, wherein:
said pivot axis is formed at an upper end of a base which is formed by L-type side elements connected by transversal bars.

10. The metering apparatus of claim 9, wherein:
said force measuring device is connected to one of said transversal bars of said base.

11. The metering apparatus of claim 1, wherein:
said stripping-off element and said charge tunnel are arranged directly adjacent to each other vis-a-vis a peripheral region of the measuring disk.

12. The metering apparatus of claim 1, wherein:
said pivot axis is arranged approximately at the height of the plane of rotation of said measuring disk.

* * * * *